(12) United States Patent
Wu et al.

(10) Patent No.: US 12,507,265 B2
(45) Date of Patent: *Dec. 23, 2025

(54) SIDELINK RESOURCES BASED ON INTERFERENCE CANCELATION CAPABILITY

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 17/811,468

(22) Filed: Jul. 8, 2022

(65) Prior Publication Data

US 2024/0015772 A1 Jan. 11, 2024

(51) Int. Cl.
*H04W 72/51* (2023.01)
*H04L 1/00* (2006.01)
*H04W 72/02* (2009.01)
*H04W 72/20* (2023.01)

(52) U.S. Cl.
CPC ........... *H04W 72/51* (2023.01); *H04L 1/0003* (2013.01); *H04L 1/0026* (2013.01); *H04W 72/02* (2013.01); *H04W 72/20* (2023.01)

(58) Field of Classification Search
CPC ..... H04W 72/51; H04W 72/02; H04W 72/20; H04W 92/18; H04L 1/0003; H04L 1/0026; H04J 11/0036
See application file for complete search history.

(56) References Cited

U.S. PATENT DOCUMENTS

| | | | |
|---|---|---|---|
| 12,238,751 B2 * | 2/2025 | Wu | H04W 72/20 |
| 2015/0139004 A1 | 5/2015 | Fodor et al. | |
| 2021/0219320 A1 | 7/2021 | Belleschi et al. | |
| 2022/0046602 A1 | 2/2022 | Hosseini et al. | |
| 2023/0328768 A1 * | 10/2023 | Wu | H04W 72/20 370/252 |

OTHER PUBLICATIONS

International Search Report and Written Opinion—PCT/US2023/068280—ISA/EPO—Sep. 7, 2023.

* cited by examiner

*Primary Examiner* — Justin T Van Roie
(74) *Attorney, Agent, or Firm* — Harrity & Harrity, LLP

(57) ABSTRACT

Various aspects of the present disclosure generally relate to wireless communication. In some aspects, a first device may transmit an indication of an interference cancellation (IC) capability of the first device. The first device may receive, from a second device, resource information for a sidelink communication. The first device may receive the sidelink communication based at least in part on the resource information. The first device may perform an action based at least in part on the IC capability. Numerous other aspects are described.

30 Claims, 10 Drawing Sheets

SIDELINK RESOURCES BASED ON INTERFERENCE CANCELATION CAPABILITY

FIELD OF THE DISCLOSURE

Aspects of the present disclosure generally relate to wireless communication and to techniques and apparatuses for using sidelink resources based on an interference cancelation capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first device. The method may include transmitting an indication of an interference cancellation (IC) capability of the first device. The method may include receiving, from a second device, resource information for a sidelink communication. The method may include receiving the sidelink communication based at least in part on the resource information. The method may include performing an action based at least in part on the IC capability.

Some aspects described herein relate to a method of wireless communication performed by a first device. The method may include transmitting an indication of a preferred resource, for a sidelink communication, that is based at least in part on an IC capability of the first device. The method may include receiving the sidelink communication from a second device.

Some aspects described herein relate to a method of wireless communication performed by a second device. The method may include receiving, from a first device, an indication of an IC capability of the first device. The method may include selecting one or more resources for a sidelink communication based at least in part on the IC capability of the first device. The method may include transmitting, to the first device, resource information that indicates the one or more resources. The method may include transmitting the sidelink communication based at least in part on the resource information.

Some aspects described herein relate to a first device for wireless communication. The first device may include a memory and one or more processors coupled to the memory. The one or more processors may be configured to transmit an indication of an IC capability of the first device. The one or more processors may be configured to receive, from a second device, resource information for a sidelink communication. The one or more processors may be configured to receive the sidelink communication based at least in part on the resource information. The one or more processors may be configured to perform an action based at least in part on the IC capability.

Some aspects described herein relate to a first device for wireless communication. The first device may include a memory and one or more processors coupled to the memory. The one or more processors may be configured to transmit an indication of a preferred resource, for a sidelink communication, that is based at least in part on an IC capability of the first device. The one or more processors may be configured to receive the sidelink communication from a second device.

Some aspects described herein relate to a second device for wireless communication. The second device may include a memory and one or more processors coupled to the memory. The one or more processors may be configured to receive, from a first device, an indication of an IC capability of the first device. The one or more processors may be configured to select one or more resources for a sidelink communication based at least in part on the IC capability of the first device. The one or more processors may be configured to transmit, to the first device, resource information that indicates the one or more resources. The one or more processors may be configured to transmit the sidelink communication based at least in part on the resource information.

Some aspects described herein relate to a non-transitory computer-readable medium that stores a set of instructions for wireless communication by a first device. The set of instructions, when executed by one or more processors of the first device, may cause the first device to transmit an indication of an IC capability of the first device. The set of instructions, when executed by one or more processors of the first device, may cause the first device to receive, from a second device, resource information for a sidelink communication. The set of instructions, when executed by one or more processors of the first device, may cause the first device to receive the sidelink communication based at least in part on the resource information. The set of instructions, when executed by one or more processors of the first device, may cause the first device to perform an action based at least in part on the IC capability.

Some aspects described herein relate to a non-transitory computer-readable medium that stores a set of instructions for wireless communication by a first device. The set of instructions, when executed by one or more processors of the first device, may cause the first device to transmit an indication of a preferred resource, for a sidelink communication, that is based at least in part on an IC capability of the first device. The set of instructions, when executed by one or more processors of the first device, may cause the first device to receive the sidelink communication from a second device.

Some aspects described herein relate to a non-transitory computer-readable medium that stores a set of instructions for wireless communication by a second device. The set of instructions, when executed by one or more processors of the second device, may cause the second device to receive, from a first device, an indication of an IC capability of the first device. The set of instructions, when executed by one or more processors of the second device, may cause the second device to select one or more resources for a sidelink communication based at least in part on the IC capability of the first device. The set of instructions, when executed by one or more processors of the second device, may cause the second device to transmit, to the first device, resource information that indicates the one or more resources. The set of instructions, when executed by one or more processors of the second device, may cause the second device to transmit the sidelink communication based at least in part on the resource information.

Some aspects described herein relate to an apparatus for wireless communication. The apparatus may include means for transmitting an indication of an IC capability of the apparatus. The apparatus may include means for receiving, from a another apparatus, resource information for a sidelink communication. The apparatus may include means for receiving the sidelink communication based at least in part on the resource information. The apparatus may include means for performing an action based at least in part on the IC capability.

Some aspects described herein relate to an apparatus for wireless communication. The apparatus may include means for transmitting an indication of a preferred resource, for a sidelink communication, that is based at least in part on an IC capability of the apparatus. The apparatus may include means for receiving the sidelink communication from another apparatus.

Some aspects described herein relate to an apparatus for wireless communication. The apparatus may include means for receiving, from another apparatus, an indication of an IC capability of the other apparatus. The apparatus may include means for selecting one or more resources for a sidelink communication based at least in part on the IC capability of the other apparatus. The apparatus may include means for transmitting, to the other apparatus, resource information that indicates the one or more resources. The apparatus may include means for transmitting the sidelink communication based at least in part on the resource information.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
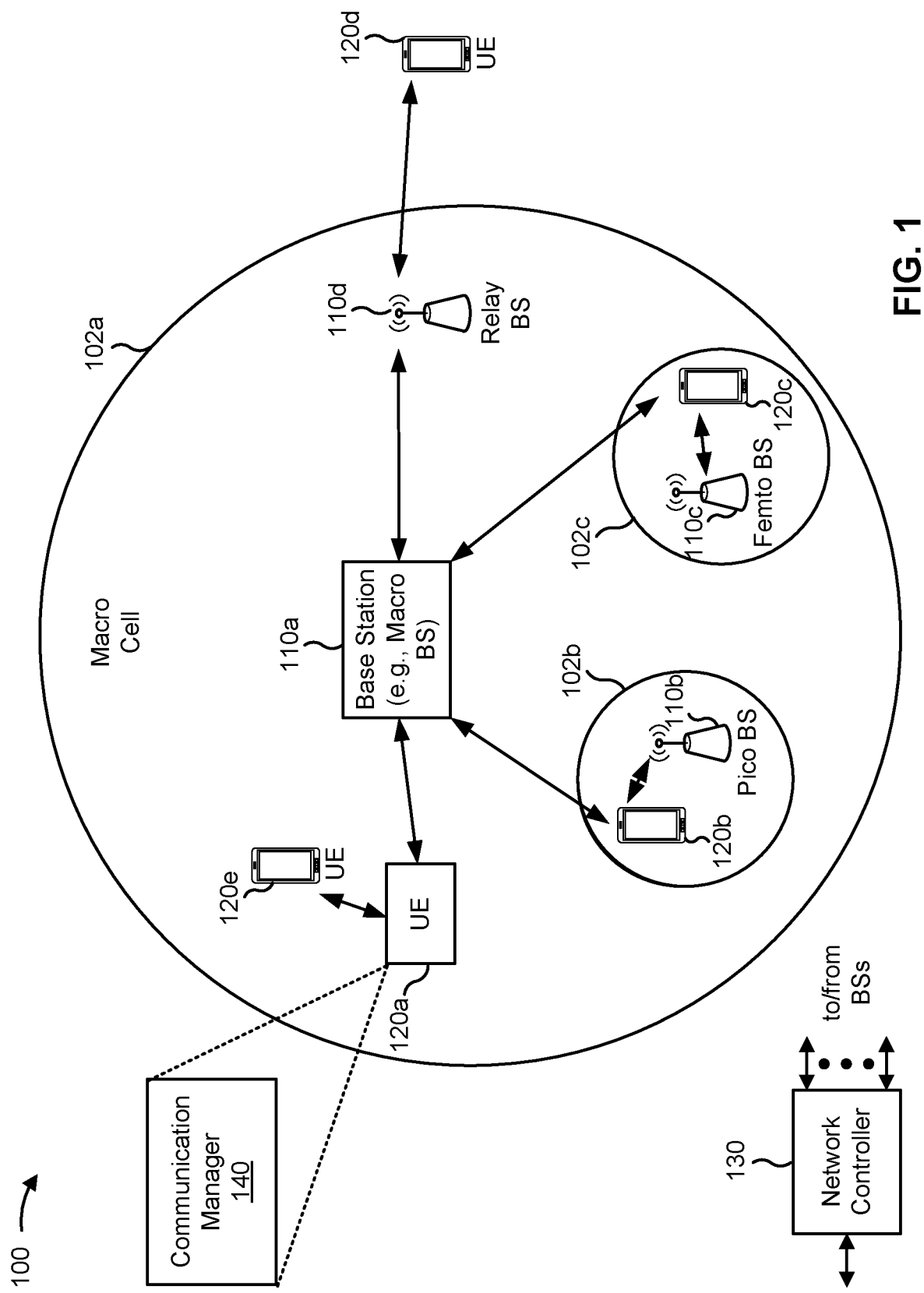
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., a UE 120) may include a communication manager 140. As described in more detail elsewhere herein, the communication manager 140 may transmit an indication of an interference cancellation (IC) capability of the first device. The communication manager 140 may receive, from a second device, resource information for a sidelink communication. The communication manager 140 may receive the sidelink communication based at least in part on the resource information and perform an action based at least in part on the IC capability.

In some aspects, the communication manager 140 may transmit an indication of a preferred resource, for a sidelink communication, that is based at least in part on an IC capability of the first device. The communication manager 140 may receive the sidelink communication from a second device. Additionally, or alternatively, the communication manager 140 may perform one or more other operations described herein.

In some aspects, a second device (e.g., a UE 120) may include a communication manager 140. As described in more detail elsewhere herein, the communication manager 140 may receive, from a first device, an indication of an IC capability of the first device. The communication manager 140 may select one or more resources for a sidelink communication based at least in part on the IC capability of the first device and transmit, to the first device, resource information that indicates the one or more resources. The communication manager 140 may transmit the sidelink communication based at least in part on the resource information. Additionally, or alternatively, the communication manager 140 may perform one or more other operations described herein.

As indicated above, FIG. 1 is provided as an example. Other examples may differ from what is described with regard to FIG. 1.

Figure 2:
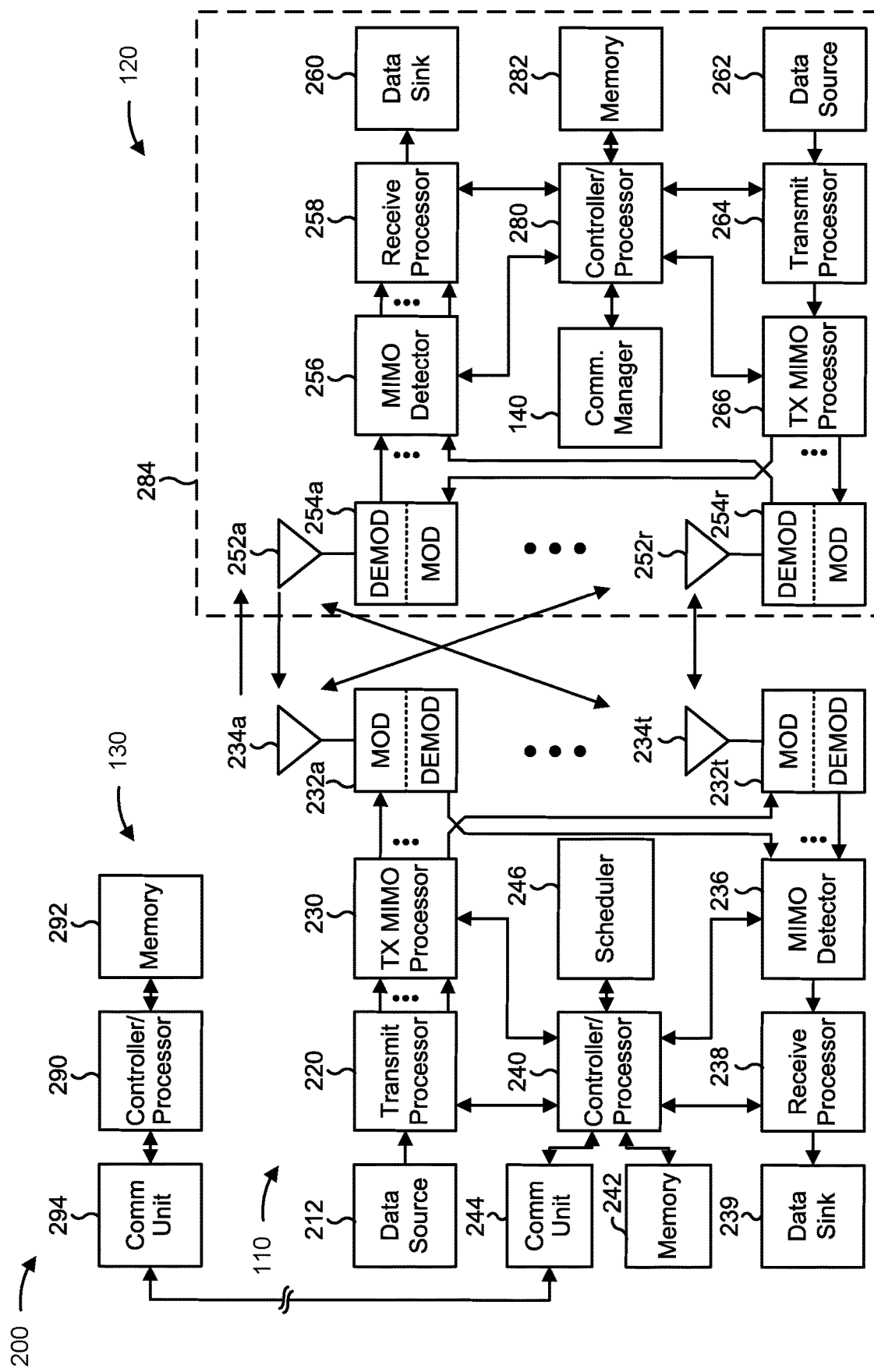
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10.

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

A controller/processor of a network entity (e.g., the controller/processor 240 of the base station 110), the controller/processor 280 of the UE 120, and/or any other component(s) of FIG. 2 may perform one or more techniques associated with using sidelink resources that are based on IC capabilities, as described in more detail elsewhere herein. In some aspects, the first device described herein is a UE 120, is included in a UE 120, or includes one or more components of a UE 120 shown in FIG. 2. In some aspects, the second device described herein is a UE 120, is included in a UE 120, or includes one or more components of a UE 120 shown in FIG. 2. For example, the controller/processor 280 of the UE 120 and/or any other component(s) of FIG. 2 may perform or direct operations of, for example, process 700 of FIG. 7, process 800 of FIG. 8, process 900 of FIG. 9, and/or other processes as described herein. The memory 282 may store data and program codes for the UE 120. In some examples, the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors, and/or the UE 120 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first device (e.g., a UE 120) includes means for transmitting an indication of an IC capability of the first device; means for receiving, from a second device, resource information for a sidelink communication; means for receiving the sidelink communication based at least in part on the resource information; and/or means for performing IC based at least in part on the IC capability. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first device includes means for transmitting an indication of a preferred resource, for a sidelink communication, that is based at least in part on an IC capability of the first device; and/or means for receiving the sidelink communication from a second device.

In some aspects, a second device (e.g., a UE 120) includes means for receiving, from a first device, an indication of an IC capability of the first device; means for selecting one or more resources for a sidelink communication based at least in part on the IC capability of the first device; means for transmitting, to the first device, resource information that indicates the one or more resources; and/or means for transmitting the sidelink communication based at least in part on the resource information. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
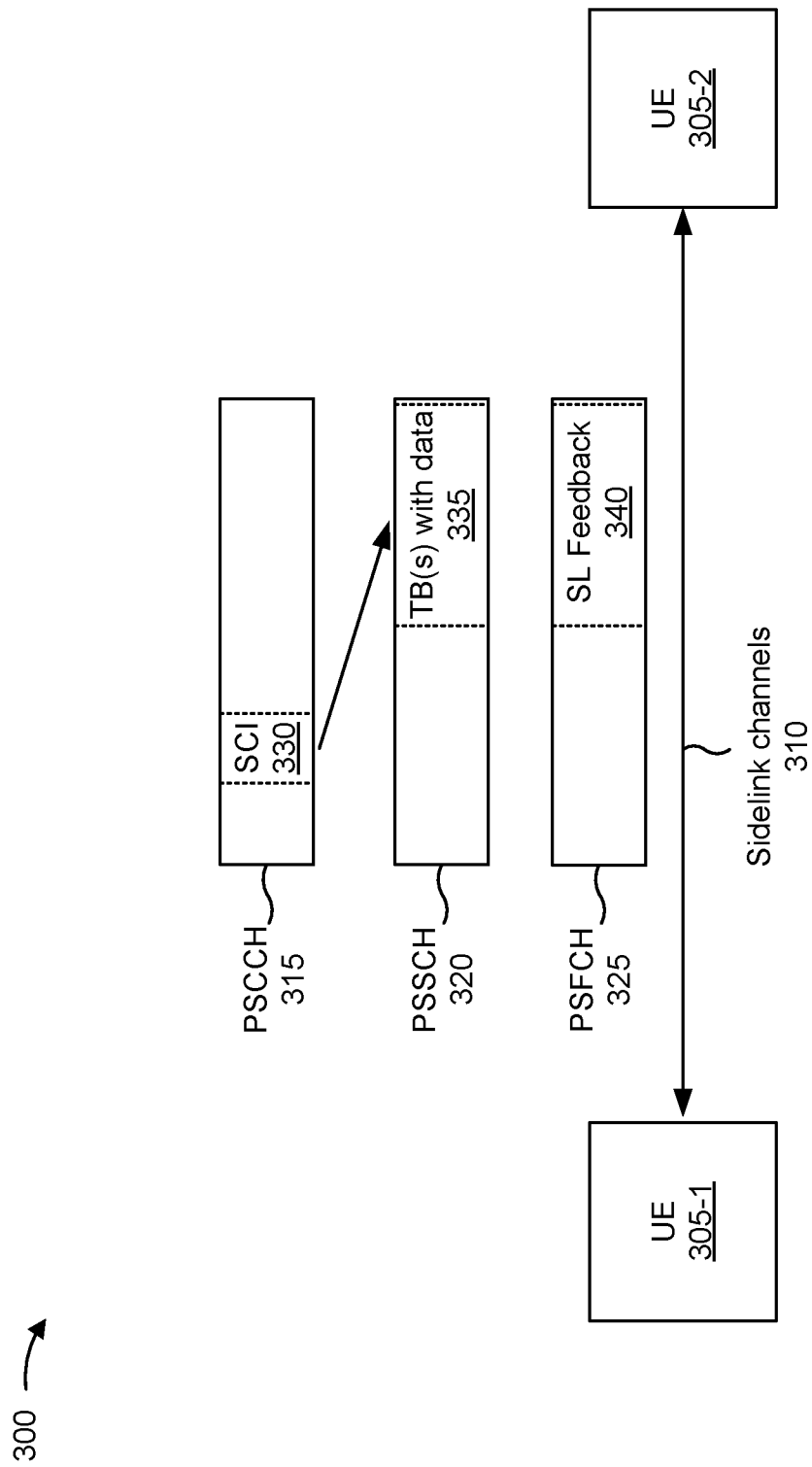
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 330, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
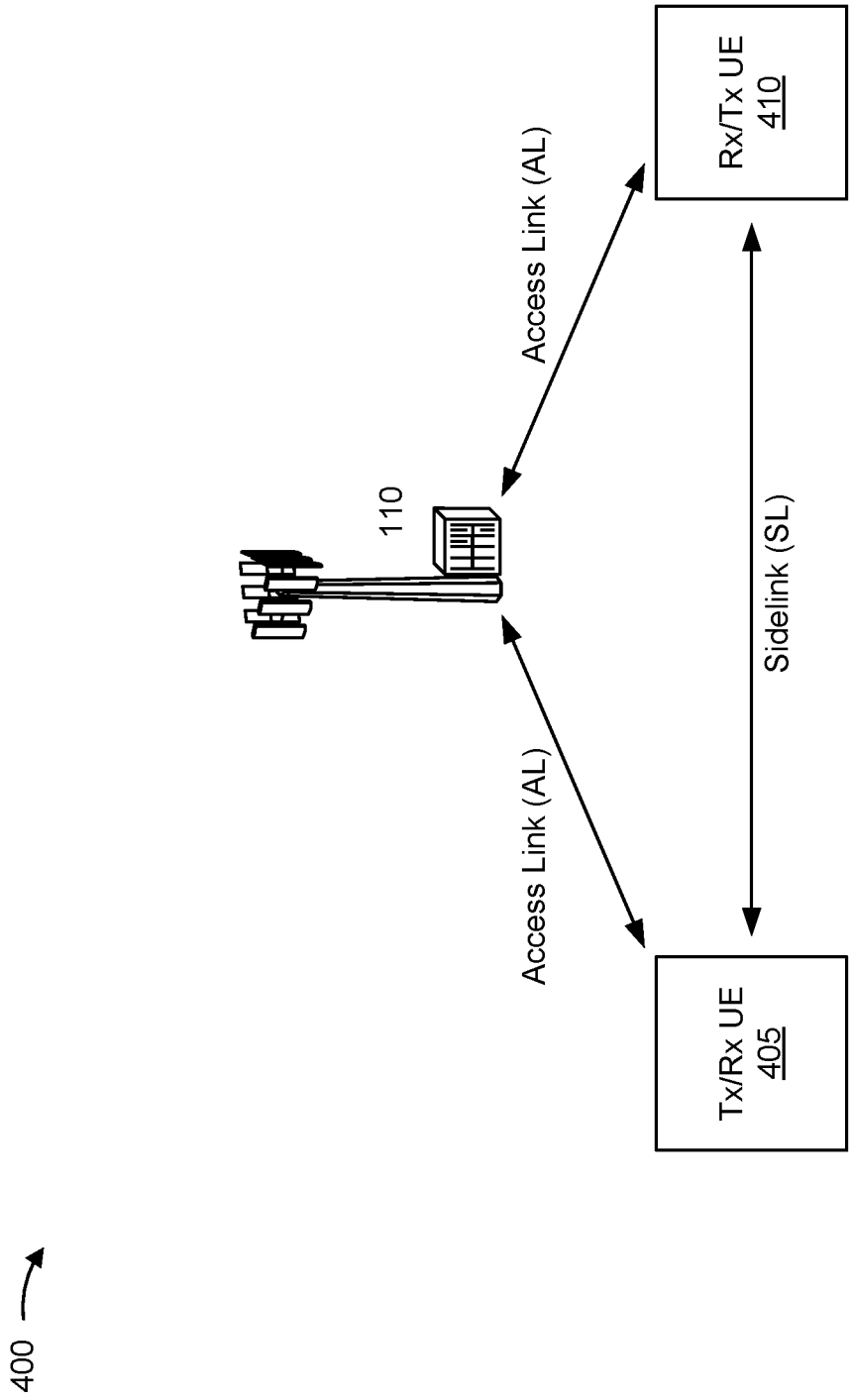
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 4. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
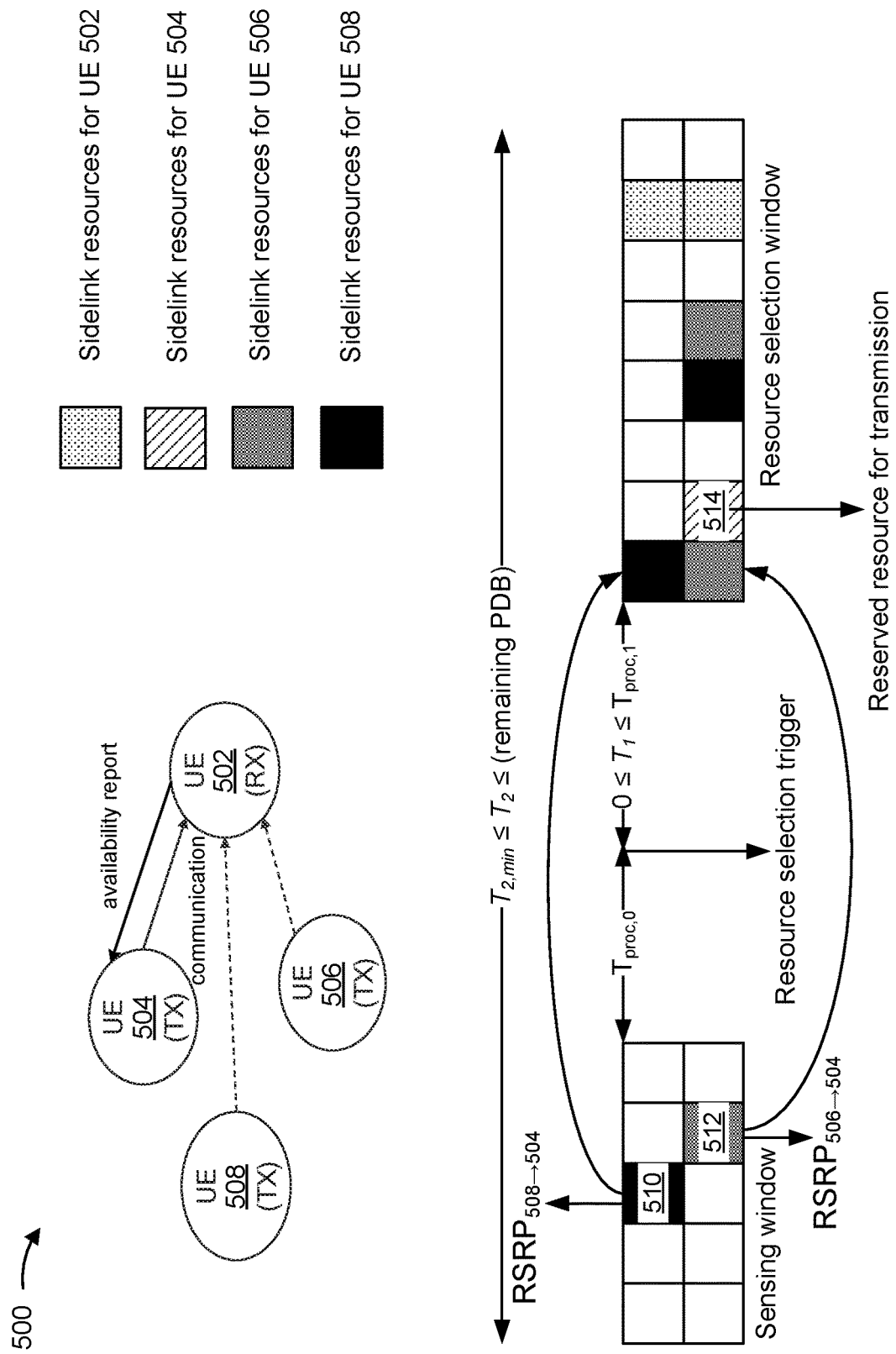
FIG. 5 is a diagram illustrating an example of selecting sidelink resources, in accordance with the present disclosure.

FIG. 5 is a diagram illustrating an example 500 of selecting sidelink resources, in accordance with the present disclosure. Example 500 shows a UE 502 (e.g., a UE 502) that may receive communications on a sidelink channel from other UEs (e.g., a UE 504), such as UE 504, UE 506, and/or UE 508.

As described in connection with FIG. 5, UE 504 is a transmitting UE that is transmitting communications to UE 502, which is a receiving UE. UE 504 may use a report from UE 502, which may act as a reporting UE that reports available sidelink resources, preferred sidelink resources, non-preferred sidelink resources, or sidelink resource conflicts. Example 500 shows an availability report from UE 502 to UE 504 and a communication from UE 504 to UE 502. The report may be request-based (e.g., UE 504 requested) or condition-based (e.g., UE 502 determines whether to send the report).

If UE 504 is to transmit a communication to UE 502, UE 504 may sense the sidelink channel in a sensing window to determine which sidelink resources (e.g., subcarriers, subchannels) are available. A sidelink resource may be considered available if the sidelink resource is clear or had a signal energy (e.g., RSRP) that satisfied an availability threshold (e.g., measured interference or energy on the channel is lower than a maximum decibel-milliwatts (dBm) or dB, RSRP threshold). The availability threshold may be configured or preconfigured per transmission priority and receive priority pair. UE 504 may measure DMRSs on a PSCCH or a PSSCH, according to a configuration.

For example, UE 504 may prepare to transmit a communication to UE 502. UE 504 may have already sensed previous sidelink resources and successfully decoded SCI from UE 506 and UE 508. UE 504 may try to reserve sidelink resources, and thus may check the availability of the future sidelink resources reserved by UE 506 and UE 508 by sensing the sidelink channel in the sensing window. UE 504 may measure an RSRP of a signal from UE 508 in sidelink resource 510, and an RSRP of a signal from UE 506 in sidelink resource 512. If an observed RSRP (RSRP projection) satisfies the RSRP threshold (e.g., is lower than a maximum RSRP), the corresponding sidelink resource may be available for reservations by UE 504. UE 504 may reserve the sidelink resource (which may be a random selection from available resources). For example, UE 504 may select and reserve sidelink resource 514 for transmission. This may be in a time slot after which UE 506 and UE 508 had used sidelink resources, and UE 504 may have sensed these sidelink resources earlier. UE 504 may select and reserve sidelink resources only upon reaching a threshold level (e.g., 20%, 30%, or 50% availability). UE 504 may increase or decrease the RSRP threshold as necessary to arrive at the threshold level. UE 504 may select and reserve sidelink resources in the current slot and up to two (or more) future slots. Reservations may be aperiodic or periodic (e.g., SCI signals period between 0 ms and 1000 ms). Periodic resource reservation may be disabled.

There may be a resource selection trigger to trigger selection of sidelink resources after a processing time $T_{proc,0}$, and before another processing time $T_{proc,1}$ before a resource selection window from which sidelink resources are available. The resource selection window may be a time window from which sidelink resources may be selected, and the resource selection window may extend for a remaining packet delay budget (PDB).

UE 504 may be power-sensitive and thus may not afford to continually sense all of the sidelink resources. UE 502 may be more capable of sensing and reporting on the sidelink resources because, for example, UE 502 may be a smart phone while UE 504 may be a smart watch. UE 502 may receive unicast communications from UE 504, and UE 502 may report back available resources to UE 504. UE 502 may continually sense the sidelink resources and measure interference levels involving neighboring UEs. For example, UE 502 may measure an RSRP of a signal from neighboring UE 506 as −92 dBm and an RSRP of a signal from neighboring UE 508 as −102 dBm. For a signal of a last transmission of UE 504, UE 502 may have measured a target signal level with an RSRP that was −90 dBm. UE 502 may estimate a signal-to-interference ratio (SIR) of a signal between UE 502 and UE 504 as −90−(−92)=2 dB and an SIR between UE 504 and UE 508 as −90−(−102)=12 dB. If the SIR of a signal from UE 504 to UE 502 with interference from UE 508 is large enough (satisfies an availability threshold) for reliable communication between UE 502 and UE 504, UE 502 may mark a sidelink resource that was reserved by UE 508 as available for use for a communication from UE 504 to UE 502. This may be useful when UE 504 has more than one data stream with varying QoS requirements or transmissions with different MCS indices.

UE 502 may transmit a report indicating an availability of each sidelink resource. Rows in the report may represent subcarriers or subchannels, and columns may represent time units (e.g., slots, symbols). The report may be a binary report, such as a bitmap. For example, UE 502 may report a 1 bit for available and a 0 bit for unavailable. UE 504 may decode the report and select (e.g., randomly) N resources from the available sidelink resources for potential N transmissions of a newly generated packet, or a packet of a transport block that has not been transmitted before. UE 504 may select N=4 sidelink resources from the available sidelink resources indicated by the report. UE 504 may also use the report to perform retransmission or resource reselection.

In some aspects, the report may involve different inter-UE coordination schemes that report different information. For example, the report may include information of Type A, which indicates one or more preferred sidelink resources for transmission. The report may include information of Type B, which indicates one or more non-preferred sidelink resources for transmission. The report may include information of Type C, which indicates expected, potential, or detected collisions of one or more sidelink resources. Information of Type A and Type B may be for a first inter-UE coordination scheme, and information of Type C may be for a second inter-UE coordination scheme. The report may involve down-selection in what resources are reported.

In some scenarios, UE 502 may be capable of IC in sidelink receiving. IC involves canceling interference to obtain a better signal. IC may be symbol level IC (SLIC). UE 502 may perform channel estimation and demodulation on a received signal, obtain a hard decision, and reconstruct a received interfering signal. UE 502 may perform IC and detect a desired signal. IC may be codeword level IC (CWIC), where decoding is further performed. CWIC may be more robust than SLIC.

UE 502 may decode a first transmission, perform IC, and decode another transmission in the same resource. As a result, UE 502, as an IC-capable UE, may be able to decode overlapping transmissions (two transmissions that are sent in overlapping resources). Overlapping transmissions can be common in sidelink autonomous resource allocation. In a broadcast/groupcast dominated network (e.g., V2X), if UE 502 uses IC, there may less interference in the overlapping transmissions. That is, received transmissions may be a desired signal from a receiver UE point of view. V2X reliability and network capacity can be improved with IC operations.

IC has not been considered for resource preference indication. A resource may be determined to be "preferred" if the resource has not been reserved by other UEs or if the resource has been reserved but the RSRP measured from the reservation signal (e.g., SCI) is below an RSRP threshold. A resource may be determined to be "non-preferred" if the resource has been reserved by other UEs and the RSRP measured from the reservation signal (e.g., SCI) is above the RSRP threshold. Furthermore, sidelink receiver capabilities (such as an IC capability) have not been considered in resource preference determination.

As indicated above, FIG. 5 is provided as an example. Other examples may differ from what is described with regard to FIG. 5.

Figure 6:
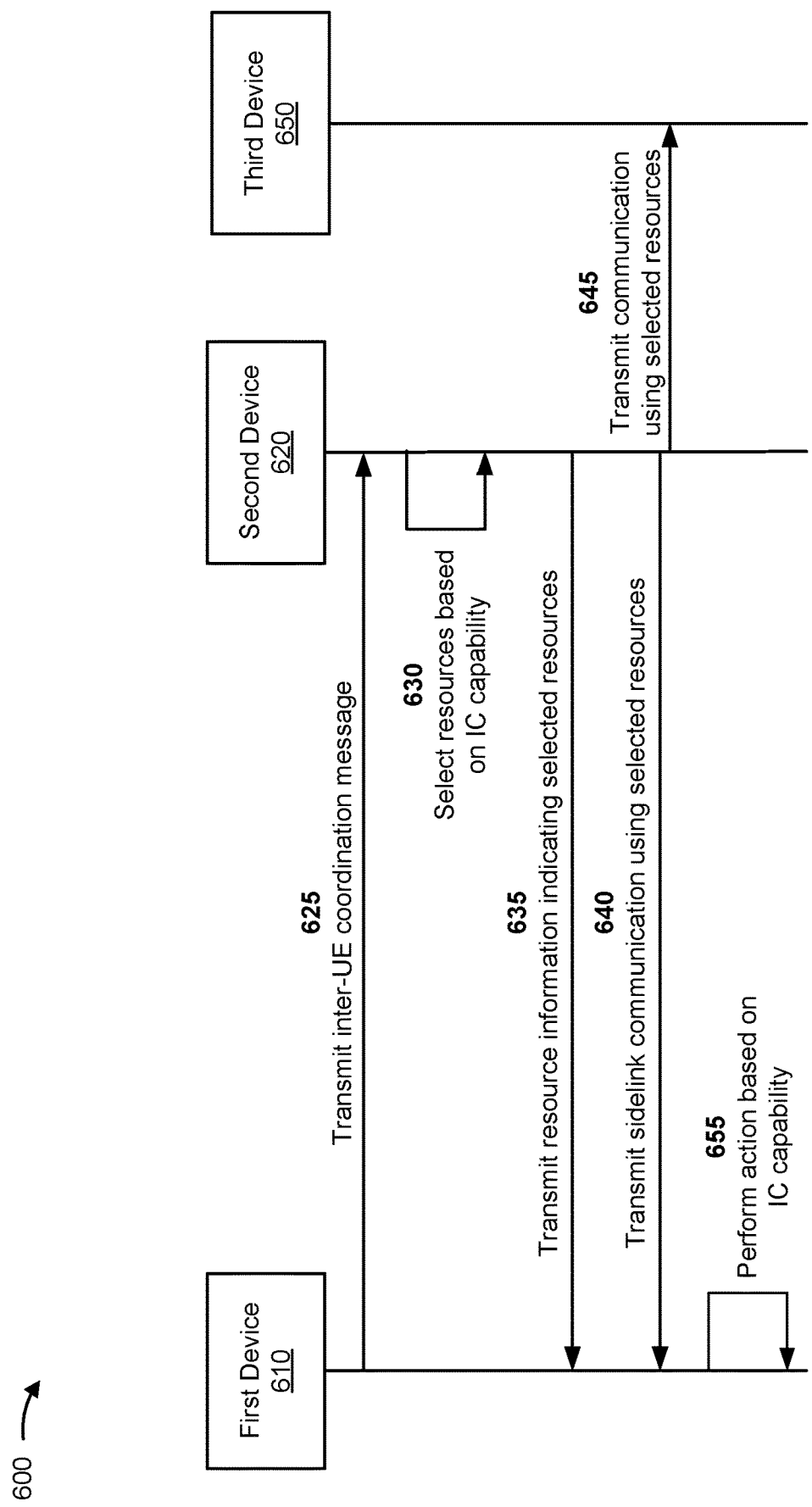
FIG. 6 is a diagram illustrating an example of using beams for communications, in accordance with the present disclosure.

FIG. 6 is a diagram illustrating an example 600 of using beams for communications, in accordance with the present disclosure. As shown in FIG. 6, a first device 610 (e.g., a UE 120, UE 502) may communicate with a second device UE 620 (e.g., a UE 120, UE 504) using a sidelink.

The first device 610 (receiving UE) may prepare to receive a sidelink communication from a second device 620 (transmitting UE) in a reserved resource. The second device 620 may select a reserved resource from candidate resources that are determined to be available by sensing. The first device 610 may indicate preferred resources (or non-preferred resources) for the sidelink communication to the second device 610. The second device 620 may select the reserved resource to use from the preferred resources and not from the non-preferred resources. This resource selection may be enhanced if the first device 610 is capable of IC (has an IC capability). According to various aspects described herein, the resource may be selected based at least in part on the IC capability of the first device 610. This IC capability may be indicated as part of inter-UE coordination. As a result, the preferred resources and the reserved resource may be selected to account for a capability of the first device 610 to perform IC.

There may be at least two scenarios where consideration of an IC capability may benefit inter-UE coordination. In a first scenario (Scenario 1), the first device 610 may be an intended recipient of a transmission from the second device 620. The first device 610 may determine a resource preference based at least in part on an IC capability of the first device 610. For example, preferred resources that are based on an IC capability of the first device 610 may have a greater RSRP threshold than an RSRP threshold that is used for preferred resources that are not based on an IC capability of the first device 610. Candidate resources for an IC capability may be sensed with a greater RSRP threshold than an RSRP threshold for candidate resources without an IC capability. In some aspects, the first device 610 may indicate a maximum MCS or spectral efficiency that the first device 610 can support in each of the preferred resources. The maximum MCS may be higher if the first device 610 has an IC capability. In some aspects, the second device 620 may be groupcasting or broadcasting, and the first device 610 may be unaware of the IC capability of the second device 620 or of the recipients of the second device 620. The first device 610 may indicate whether an IC capability is assumed when determining a preferred or non-preferred resource for the second device 620.

In a second scenario (Scenario 2), the first device 610 may be a stand-by UE that is helping the second device 620 with its resource allocation but is not a recipient of a sidelink communication from the second device 620. The first device 610 may or may not be aware of the IC capability of the second device 620 or recipients of the second device 620. In some aspects, the second device 620 may indicate or imply, in a transmission from the second device 620, whether a reserved resource or candidate resources account for an IC capability. The first device 610 may determine a resource preference based at least in part on the indication or implication.

In some aspects, the first device 610 may be unaware of any IC capability considered by the second device 620 and may indicate whether an IC capability is assumed for a preferred or non-preferred resource. For example, the first device 610 may determine a first set of resources that assumes an IC capability. The first device 610 may also determine a second set of resources that assumes no IC capability. The first device 610 may indicate both the first set of resources and the second set of resources to the second device 620. The first set of resources and the second set of resources may be for preferred resources or for reserved resources. The first set of resources may be exclusive of the second set of resources.

In some aspects, the first set of resources and the second set of resources may be for non-preferred resources. The first device 610 may determine a first set of non-preferred resources assuming IC capability. Note that if a resource is determined to be non-preferred assuming a recipient has an IC capability, the resource may also be non-preferred when the recipient has no IC capability. A resource may be determined to be non-preferred if an RSRP measured for the resource is greater than an RSRP threshold. The first device 610 may determine a second set of non-preferred resources assuming no IC capability. This may involve a smaller RSRP threshold. For example, a resource may be in the second set of resources if an associated RSRP threshold of the resource is greater than the smaller RSRP threshold but smaller than the larger RSRP threshold. The second device 620 may exclude non-preferred resources in resource selection based on intended recipients' IC capabilities The second device 620 may exclude the first set of non-preferred resources if the recipient has an IC capability and exclude both the first and second sets of resources if at least one intended recipient has no IC capability (or the second device 620 is unaware of an intended recipient's IC capability).

Example 600 shows an example of Scenario 1. As shown by reference number 625, the first device 610 may transmit an inter-UE coordination message (e.g., via SCI or a medium access control control element (MAC CE)). The inter-UE coordination message may indicate one or more preferred resources. The inter-UE coordination message or a separate message may indicate an IC capability of the first device 610. The IC capability may be when the first device 610 can perform IC and/or to what extent the first device 610 may perform IC. For example, the inter-UE coordination message or a separate message may indicate, for each of the preferred resources, a maximum MCS that can be supported in the resource, a recommended CQI index for the resource, and/or a maximum or recommended spectral efficiency for the resource. An IC capability (or a greater IC capability) may enable use of a greater MCS, CQI index, or spectral efficiency. A lesser IC capability or no IC capability may only allow for a lesser MCS, CQI index, or spectral efficiency because interference is not canceled and the signal-to-interference-plus-noise ratio (SINR) may be smaller. The second device 620 may determine an MCS based at least in part on the indicated CQI index or spectral efficiency.

In some aspects, the first device 610 may determine the maximum MCS, the CQI index, and/or the spectral efficiency in various ways. For example, the first device 610 may estimate a signal power from a reference signal sent by the second device 620 in a previous transmission by the second device 620. The first device 610 may estimate the interference power and the noise power from the signal sent by another device that reserved the preferred resource. If the preferred resource is a resource that has not been reserved by other devices, the first device 610 may assume the interference power is 0 (zero). The first device 610 may determine the SINR from the estimates. The first device 610 may map the SINR to a maximum MCS, CQI index, or spectral efficiency, taking into account the IC capability of the first device 610.

In some aspects, the first device 610 may indicate two or more maximum MCSs, CQI indices, or spectral efficiencies. For example, the first device may determine and indicate a maximum MCS, a CQI index, and/or a spectral efficiency assuming that the first device 610 will perform IC, and determine and indicate another maximum MCS, CQI index, and/or spectral efficiency assuming that the first device 610 will not perform IC. The second device 620 may determine an MCS based at least in part on preference indications from all intended recipients.

As shown by reference number 630, the second device 620 may select resources for a sidelink communication based at least in part on the IC capability of the first device 610. The second device 620 may also select resources based at least in part on a maximum MCS, a CQI index, and/or a spectral efficiency. The second device 620 may select the resources from the preferred resources indicated in the inter-UE coordination message. The preferred resources may be based at least in part on the IC capability of the first device 610. If the first device 610 indicated that the preferred resources are based on an IC capability of the first device 610, the second device 620 may select the preferred resources or other resources that are based at least in part on the IC capability of the first device 610 (more tolerant to interference). If the first device 610 indicated that the preferred resources are not based on an IC capability of the first device 610, the second device 620 may select the preferred resources or other resources that are based at least in part on the first device 610 not having an IC capability (or not being aware of an IC capability). As shown by reference number 635, the second device 620 may transmit resource information indicating the selected resources. The selected resources may indicate available resources and/or reserved resources.

In some aspects, the second device 620 may indicate, in the resource information or in a later communication (e.g., a field in SCI), an IC capability of the first device 610 or another intended recipient. For example, the second device 620 may indicate that the resource information is intended for an IC-capable device or not intended for an IC-capable device. The second device 620 may indicate this in an inter-UE coordination message or in a transmission using a destination identifier (ID). The second device 620 may indicate that the resource information is intended for an IC-capable device or not intended for an IC-capable device by implication or by configuration with a sidelink resource pool configuration. For example, transmission to an IC-capable device may take place in a dedicated resource pool. When the first device 610 indicates a preferred resource from the dedicated resource pool, recipients that use resources of the dedicated resource pool may be assumed to be IC-capable.

In some aspects, the first device 610 may determine preferred resources based at least in part on the second device 620's intended recipients having an IC capability. If the intended recipients of the second device's 620 transmission are IC-capable, the first device 610 may assume that the second devices 620's transmission is more interference-tolerable. Accordingly, the first device 610 may apply a larger RSRP threshold when determining resource availability. For example, the first device 610 may apply an RSRP threshold (RSRP_1) to determine whether a reserved resource is available based at least in part on a measured RSRP from signaling making the reservation, if the second device 620's transmission is intended for a non-IC-capable recipient. The first device 610 may apply a different RSRP threshold (RSRP_2) to determine whether a reserved resource is available based at least in part on a measured RSRP from signaling making the reservation, if the second device 620's transmission is intended for an IC-capable recipient. A resource may be excluded from being a preferred resource if the associated RSRP is greater than RSRP_2 and RSRP_1 is less than RSRP_2. There may be multiple sets of preferred resources associated with multiple RSRP thresholds.

For non-preferred resources, the first device 610 may use RSRP_1 for a first set of non-preferred resources and then apply a greater RSRP_2 to the first set of non-preferred resources to identify resources for the second set of non-preferred resources. The remaining resources in the first set of non-preferred resource may belong to a third set of non-preferred resources (e.g., set 1 is the union of set 2 and set 3). The second device 620 may exclude both the second set of non-preferred resources and the third set of non-preferred resources during resource selection if not all of the recipients are IC capable (or if the second device 620 is unaware of the recipients' IC capabilities). Only the second set of non-preferred resources may be excluded during resource selection if the second device 620's recipients are IC capable. There may be multiple sets of non-preferred resources associated with multiple RSRP thresholds.

As shown by reference number 640, the second device 620 may transmit the sidelink communication using the selected resources. If Scenario 2 is involved and the first device 610 is a stand-by UE rather than a recipient of the sidelink communication, as shown by reference number 645, the second device 620 may transmit a sidelink communication to a third device 650 using information provided by the first device 610. The second device 620 may transmit resource information to the third device 650 before transmitting the communication.

As shown by reference number 655, the first device 610 may perform an action. The action may include receiving the sidelink communication. The action may also include decoding the sidelink communication. For example, the sidelink communication may be a transport block, and the first device 610 may decode the transport block based at least in part on SCI that is associated with the transport block. The first device 610 may also decode the SCI before decoding the transport block.

In some aspects, the action may include performing IC on the sidelink communication. This may include canceling interference to obtain a better signal. The first device 610 may reconstruct a received interfering signal and cancel the interfering signal to detect a desired signal. The first device 610 may cancel interference at the symbol level or the codeword level. The first device 620 may perform IC only for the resource information. Successful decoding may help with reconstructing the interfering signal and/or detecting the desired signal.

In some aspects, the action may include reporting an interfering signal used for IC. This may include transmitting information about the interfering signal and/or the IC. In some aspects, the action may include recording the interfering signal.

By accounting for IC capabilities of devices in inter-UE coordination, resource selection may be improved. Improved resource selection improves communications and allows for sidelink devices to conserve processing resources and signaling resources.

As indicated above, FIG. 6 is provided as an example. Other examples may differ from what is described with respect to FIG. 6.

Figure 7:
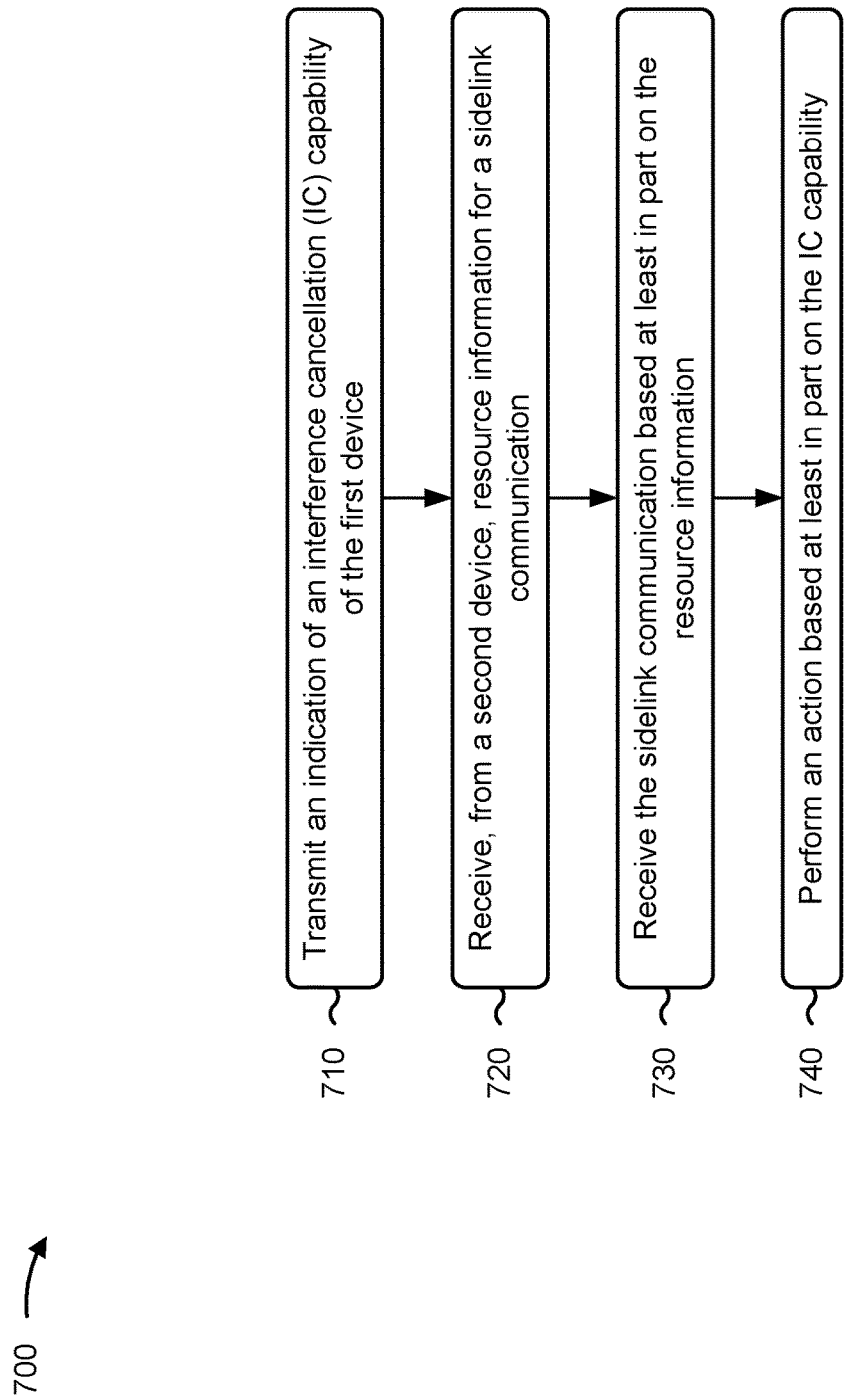
FIG. 7 is a diagram illustrating an example process performed, for example, by a first device, in accordance with the present disclosure.

FIG. 7 is a diagram illustrating an example process 700 performed, for example, by a first device, in accordance with the present disclosure. Example process 700 is an example where the first device (e.g., first device 610) performs operations associated with selecting sidelink resources based on IC capabilities.

As shown in FIG. 7, in some aspects, process 700 may include transmitting an indication of an IC capability of the first device (block 710). For example, the first device (e.g., using communication manager 1008 and/or transmission component 1004 depicted in FIG. 10) may transmit an indication of an IC capability of the first device, as described above.

As further shown in FIG. 7, in some aspects, process 700 may include receiving, from a second device, resource information for a sidelink communication (block 720). For example, the first device (e.g., using communication manager 1008 and/or reception component 1002 depicted in FIG. 10) may receive, from a second device, resource information for a sidelink communication, as described above.

As further shown in FIG. 7, in some aspects, process 700 may include receiving the sidelink communication based at least in part on the resource information (block 730). For example, the first device (e.g., using communication manager 1008 and/or reception component 1002 depicted in FIG. 10) may receive the sidelink communication based at least in part on the resource information, as described above.

As further shown in FIG. 7, in some aspects, process 700 may include performing an action based at least in part on the IC capability (block 740). For example, the first device (e.g., using communication manager 1008 and/or action component 1012 depicted in FIG. 10) may perform an action based at least in part on the IC capability, as described above. The action may include performing IC in association with sidelink communication.

Process 700 may include additional aspects, such as any single aspect or any combination of aspects described below and/or in connection with one or more other processes described elsewhere herein.

In a first aspect, process 700 includes transmitting an indication of a maximum MCS that is supported for preferred resources.

In a second aspect, alone or in combination with the first aspect, process 700 includes transmitting an indication of a spectral efficiency that is supported for preferred resources.

In a third aspect, alone or in combination with one or more of the first and second aspects, process 700 includes transmitting an indication of a CQI index that is supported for preferred resources.

In a fourth aspect, alone or in combination with one or more of the first through third aspects, process 700 includes determining a maximum MCS, a CQI index, a spectral efficiency for a preferred resource, or some combination thereof.

In a fifth aspect, alone or in combination with one or more of the first through fourth aspects, process 700 includes transmitting preferred resource information that indicates first preferred resources and that indicates that the first preferred resources are based at least in part on the IC capability of the first device.

In a sixth aspect, alone or in combination with one or more of the first through fifth aspects, the preferred resource information indicates second preferred resources and indicates that the second preferred resources are not based at least in part on the IC capability.

In a seventh aspect, alone or in combination with one or more of the first through sixth aspects, the first preferred resources are based at least in part on an RSRP that is higher than an RSRP that is used for the second preferred resources.

In an eighth aspect, alone or in combination with one or more of the first through seventh aspects, transmitting the preferred resource information includes transmitting the preferred resource information in a coordination message that is included in SCI or a MAC CE.

In a ninth aspect, alone or in combination with one or more of the first through eighth aspects, process 700 includes transmitting a first indication of a first MCS, a first CQI index, a first spectral efficiency for the first preferred resources, or some combination thereof and a second indication of one or more of a second MCS, a second CQI index, a second spectral efficiency for the second preferred resources, or some combination thereof.

In a tenth aspect, alone or in combination with one or more of the first through ninth aspects, process 700 includes transmitting non-preferred resource information that indicates first non-preferred resources and that indicates that the first non-preferred resources are based at least in part on the IC capability.

In an eleventh aspect, alone or in combination with one or more of the first through tenth aspects, the non-preferred resource information indicates second non-preferred resources and indicates that the second non-preferred resources are not based at least in part on the IC capability.

In a twelfth aspect, alone or in combination with one or more of the first through eleventh aspects, the first non-preferred resources are based at least in part on an RSRP threshold that is higher than a second RSRP threshold that is used for the second non-preferred resources.

In a thirteenth aspect, alone or in combination with one or more of the first through twelfth aspects, process 700 includes transmitting information for multiple sets of resources based at least in part on multiple RSRP thresholds.

In a fourteenth aspect, alone or in combination with one or more of the first through thirteenth aspects, performing the action includes performing IC on the sidelink communication.

In a fifteenth aspect, alone or in combination with one or more of the first through fourteenth aspects, performing the action includes decoding the sidelink communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
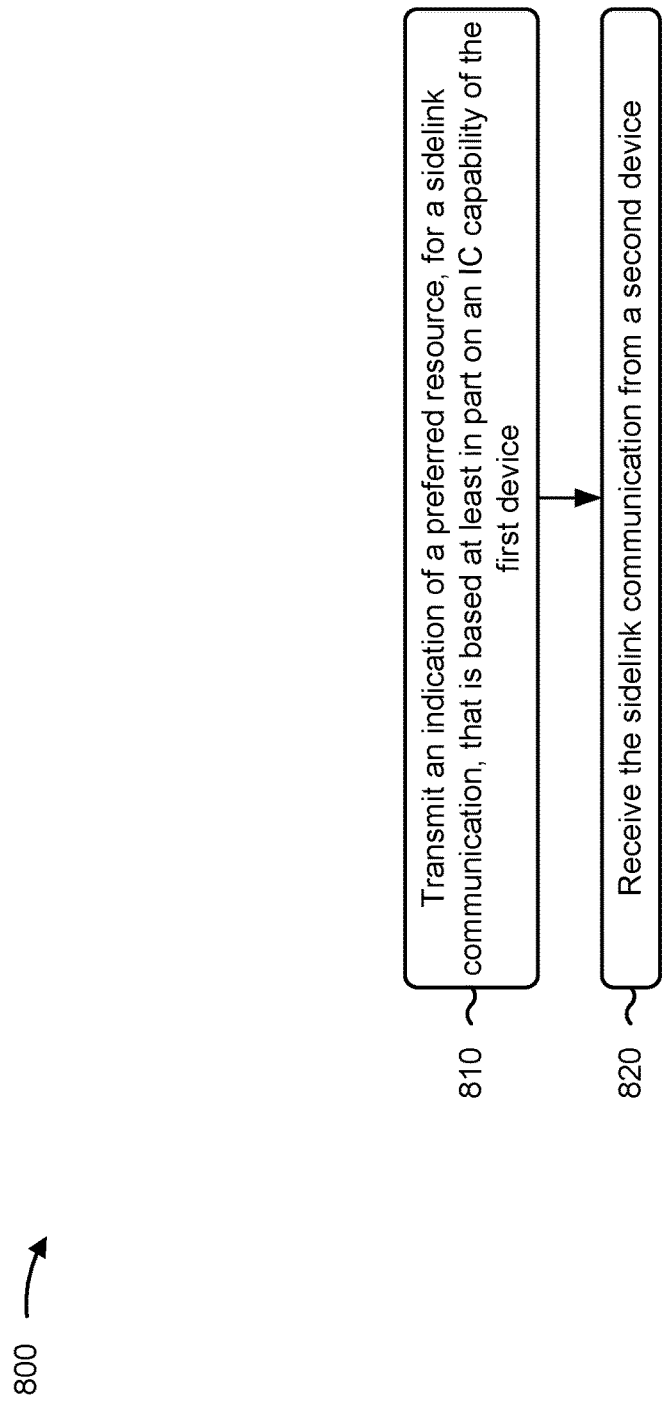
FIG. 8 is a diagram illustrating an example process performed, for example, by a first device, in accordance with the present disclosure.

FIG. 8 is a diagram illustrating an example process 800 performed, for example, by a first device, in accordance with the present disclosure. Example process 800 is an example where the first device (e.g., first device 610) performs operations associated with selecting sidelink resources based on IC capabilities.

As shown in FIG. 8, in some aspects, process 800 may include transmitting an indication of a preferred resource, for a sidelink communication, that is based at least in part on an IC capability of the first device (block 810). For example, the first device (e.g., using communication manager 1008 and/or transmission component 1004 depicted in FIG. 10) may transmit an indication of a preferred resource, for a sidelink communication, that is based at least in part on an IC capability of the first device, as described above.

As further shown in FIG. 8, in some aspects, process 800 may include receiving the sidelink communication from a second device (block 820). For example, the first device (e.g., using communication manager 1008 and/or reception component 1002 depicted in FIG. 10) may receive the sidelink communication from a second device, as described above.

Process 800 may include additional aspects, such as any single aspect or any combination of aspects described below and/or in connection with one or more other processes described elsewhere herein.

In a first aspect, process 800 includes performing IC based at least in part on the IC capability of the first device.

In a second aspect, alone or in combination with the first aspect, process 800 includes receiving resource information for the sidelink communication that indicates whether the resource information is associated with one or more of the IC capability of the first device or an IC capability of the second device.

In a third aspect, alone or in combination with one or more of the first and second aspects, process 800 includes transmitting an IC indication that indicates that the preferred resource is associated with the IC capability of the first device.

In a fourth aspect, alone or in combination with one or more of the first through third aspects, process 800 includes receiving an IC indication that indicates that the sidelink communication is intended for an IC capable receiver.

In a fifth aspect, alone or in combination with one or more of the first through fourth aspects, the IC indication is included in a request for a coordination message, a destination identifier, or a sidelink resource pool configuration.

In a sixth aspect, alone or in combination with one or more of the first through fifth aspects, the preferred resource is based at least in part on a first RSRP threshold that is higher than a second RSRP threshold that is used for preferred resources that are not based at least in part on the IC capability.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
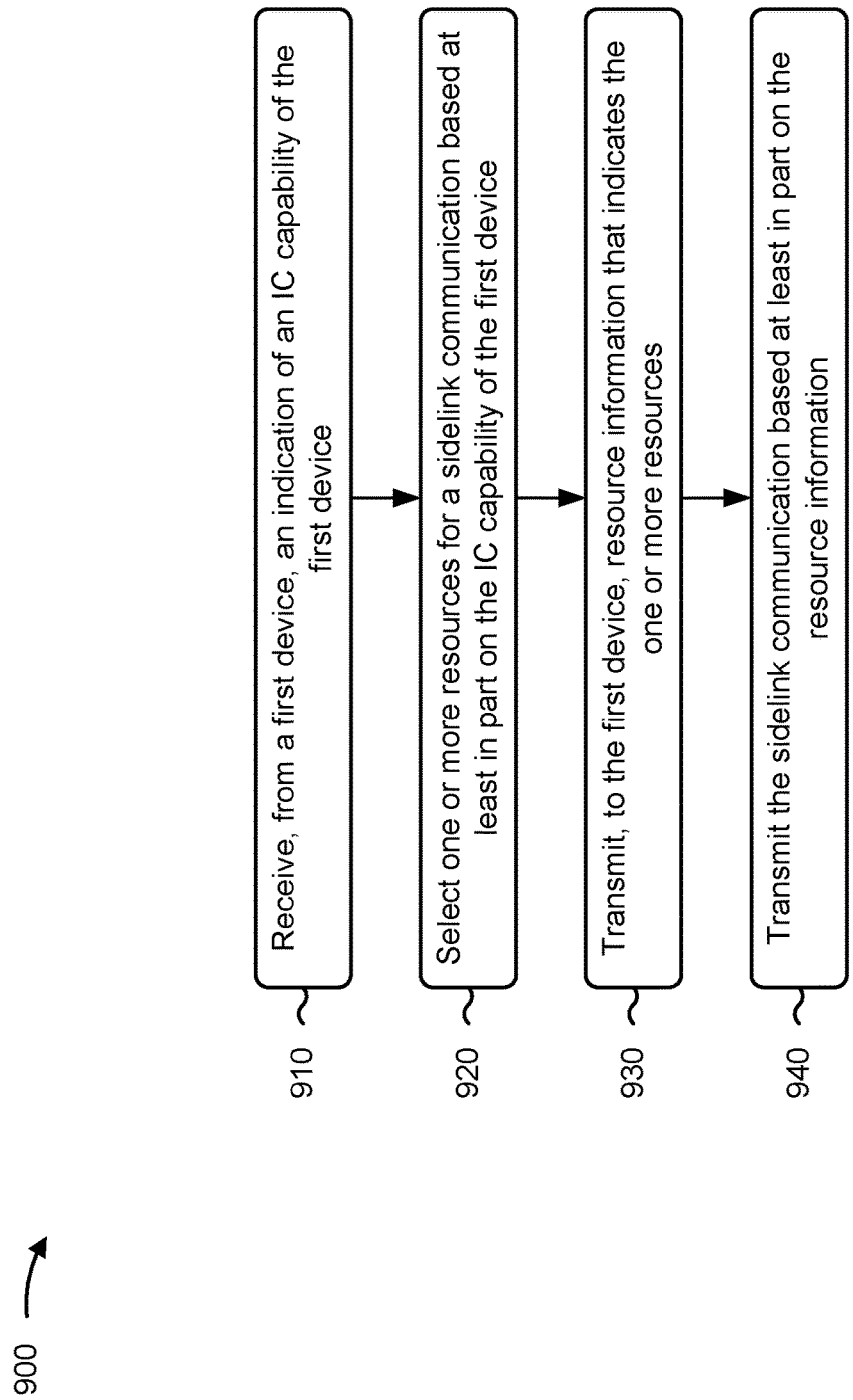
FIG. 9 is a diagram illustrating an example process performed, for example, by a second device, in accordance with the present disclosure.

FIG. 9 is a diagram illustrating an example process 900 performed, for example, by a second device, in accordance with the present disclosure. Example process 900 is an example where the second device (e.g., second device 620) performs operations associated with selecting sidelink resources based on IC capabilities.

As shown in FIG. 9, in some aspects, process 900 may include receiving, from a first device, an indication of an IC capability of the first device (block 910). For example, the second device (e.g., using communication manager 1008 and/or reception component 1002 depicted in FIG. 10) may receive, from a first device, an indication of an IC capability of the first device, as described above.

As further shown in FIG. 9, in some aspects, process 900 may include selecting one or more resources for a sidelink communication based at least in part on the IC capability of the first device (block 920). For example, the second device (e.g., using communication manager 1008 and/or selection component 1010, depicted in FIG. 10) may select one or more resources for a sidelink communication based at least in part on the IC capability of the first device, as described above.

As further shown in FIG. 9, in some aspects, process 900 may include transmitting, to the first device, resource information that indicates the one or more resources (block 930). For example, the second device (e.g., using communication manager 1008 and/or transmission component 1004 depicted in FIG. 10) may transmit, to the first device, resource information that indicates the one or more resources, as described above.

As further shown in FIG. 9, in some aspects, process 900 may include transmitting the sidelink communication based at least in part on the resource information (block 940). For example, the second device (e.g., using communication manager 1008 and/or transmission component 1004 depicted in FIG. 10) may transmit the sidelink communication based at least in part on the resource information, as described above.

Process 900 may include additional aspects, such as any single aspect or any combination of aspects described below and/or in connection with one or more other processes described elsewhere herein.

In a first aspect, the resource information indicates whether the resource information is associated with one or more of the IC capability of the first device or an IC capability of the second device.

In a second aspect, alone or in combination with the first aspect, process 900 includes receiving an indication of one or more of a maximum MCS, a CQI index, a spectral efficiency that is supported for preferred resources, or some combination thereof, where selecting the one or more resources includes selecting the one or more resources further based at least in part on the one or more of the maximum MCS, the CQI index, the spectral efficiency, or some combination thereof.

In a third aspect, alone or in combination with one or more of the first and second aspects, process 900 includes transmitting an indication of the IC capability of the first device in SCI, a destination ID, or a sidelink resource pool configuration.

In a fourth aspect, alone or in combination with one or more of the first through third aspects, process 900 includes receiving preferred resource information that indicates first preferred resources, second preferred resources, first non-preferred resources, second non-preferred resources, or some combination thereof, where the first preferred resources and the first non-preferred resources are based at least in part on the IC capability and the second preferred resources and the second non-preferred resources are not based at least in part on the IC capability, and selecting the one or more resources includes selecting the one or more resources based at least in part on the one or more of the first preferred resources, the second preferred resources, the first non-preferred resources, the second non-preferred resources, or some combination thereof.

In a fifth aspect, alone or in combination with one or more of the first through fourth aspects, selecting the one or more resources includes selecting the one or more resources from among the first preferred resources and not from among the first non-preferred resources or the second non-preferred resources.

In a sixth aspect, alone or in combination with one or more of the first through fifth aspects, selecting the one or more resources includes selecting the one or more resources based at least in part on a first RSRP threshold that is based at least in part on the IC capability of the first device and that is higher than a second RSRP threshold that is used for preferred resources that are not based at least in part on the IC capability.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
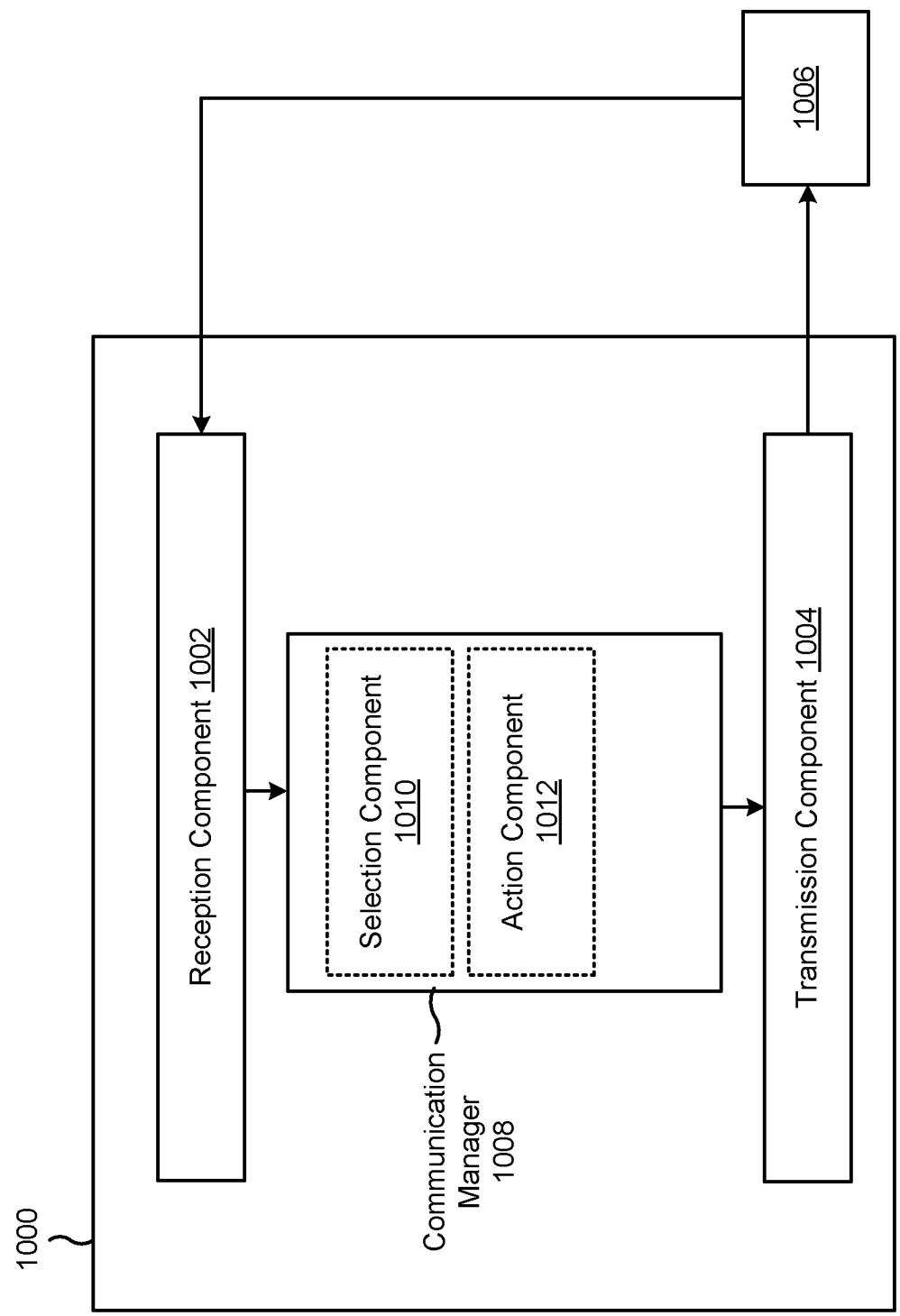
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a first device (e.g., a UE 120, first device 610) or a second device (e.g., a UE 120, second device 620), or a first device or second device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the UE described in connection with FIG. 2. The communication manager 1008 may be, or be similar to, the communication manager 140 depicted in FIGS. 1 and 2. For example, in some aspects, the communication manager 1008 may be configured to perform one or more of the functions described as being performed by the communication manager 140. In some aspects, the communication manager 1008 may include the reception component 1002 and/or the transmission component 1004. The communication manager 1008 may include a selection component 1010 and/or an action component 1012, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 700 of FIG. 7, process 800 of FIG. 8, process 900 of FIG. 9, or a combination thereof. In some aspects, the apparatus 1000 and/or one or more components shown in FIG. 10 may include one or more components of the first device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first device described in connection with FIG. 2. In some aspects, the transmission component 1004 may be co-located with the reception component 1002 in a transceiver.

In some aspects as a first device, the transmission component 1004 may transmit an indication of an IC capability of the first device. The reception component 1002 may receive, from a second device, resource information for a sidelink communication. The reception component 1002 may receive the sidelink communication based at least in part on the resource information. The action component 1012 may perform an action based at least in part on the IC capability.

The transmission component 1004 may transmit an indication of a maximum MCS that is supported for preferred resources. The transmission component 1004 may transmit an indication of a spectral efficiency that is supported for preferred resources. The transmission component 1004 may transmit an indication of a CQI index that is supported for preferred resources. The selection component 1010 may determine a maximum MCS, a CQI index, a spectral efficiency for a preferred resource, or some combination thereof.

The transmission component 1004 may transmit preferred resource information that indicates first preferred resources and that indicates that the first preferred resources are based at least in part on the IC capability of the first device. The transmission component 1004 may transmit a first indication of a first MCS, a first CQI index, a first spectral efficiency for the first preferred resources, or some combination thereof and a second indication of one or more of a second MCS, a second CQI index, a second spectral efficiency for the second preferred resources, or some combination thereof.

The transmission component 1004 may transmit non-preferred resource information that indicates first non-preferred resources and that indicates that the first non-preferred resources are based at least in part on the IC capability. The transmission component 1004 may transmit information for multiple sets of resources based at least in part on multiple RSRP thresholds.

In some aspects as a first device, the transmission component 1004 may transmit an indication of a preferred resource, for a sidelink communication, that is based at least in part on an IC capability of the first device. The reception component 1002 may receive the sidelink communication from a second device.

The action component 1012 may perform IC based at least in part on the IC capability of the first device. The reception component 1002 may receive resource information for the sidelink communication that indicates whether the resource information is associated with one or more of the IC capability of the first device or an IC capability of the second device. The transmission component 1004 may transmit an indication that the preferred resource is associated with the IC capability of the first device. The reception component 1002 may receive an indication that the sidelink communication is intended for an IC capable receiver.

In some aspects as a second device, the reception component 1002 may receive, from a first device, an indication of an IC capability of the first device. The selection component 1010 may select one or more resources for a sidelink communication based at least in part on the IC capability of the first device. The transmission component 1004 may transmit, to the first device, resource information that indicates the one or more resources. The transmission component 1004 may transmit the sidelink communication based at least in part on the resource information.

The reception component 1002 may receive an indication of one or more of a maximum MCS, a CQI index, a spectral efficiency that is supported for preferred resources, or some combination thereof. The selection component 1010 may select the one or more resources further based at least in part on the one or more of the maximum MCS, the CQI index, the spectral efficiency, or some combination thereof.

The transmission component 1004 may transmit an indication of the IC capability of the first device in SCI, a destination ID, or a sidelink resource pool configuration. The reception component 1002 may receive preferred resource information that indicates first preferred resources, second preferred resources, first non-preferred resources, second non-preferred resources, or some combination thereof, where the first preferred resources and the first non-preferred resources are based at least in part on the IC capability, and the second preferred resources and the second non-preferred resources are not based at least in part on the IC capability. The selection component 1010 may select the one or more resources based at least in part on the one or more of the first preferred resources, the second preferred resources, the first non-preferred resources, the second non-preferred resources, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first device, comprising: transmitting an indication of an interference cancellation (IC) capability of the first device; receiving, from a second device, resource information for a sidelink communication; and receiving the sidelink communication based at least in part on the resource information.

Aspect 2: The method of Aspect 1, further comprising transmitting an indication of a maximum modulation and coding scheme that is supported for preferred resources.

Aspect 3: The method of Aspect 1 or 2, further comprising transmitting an indication of a spectral efficiency that is supported for preferred resources.

Aspect 4: The method of any of Aspects 1-3, further comprising transmitting an indication of a channel quality indicator index that is supported for preferred resources.

Aspect 5: The method of any of Aspects 1-4, further comprising determining a maximum modulation and coding scheme, a channel quality indicator index, a spectral efficiency for a preferred resource, or some combination thereof.

Aspect 6: The method of any of Aspects 1-5, further comprising transmitting preferred resource information that indicates first preferred resources and that indicates that the first preferred resources are based at least in part on the IC capability of the first device.

Aspect 7: The method of Aspect 6, wherein the preferred resource information indicates second preferred resources and indicates that the second preferred resources are not based at least in part on the IC capability.

Aspect 8: The method of Aspect 7, wherein the first preferred resources are based at least in part on a reference signal received power (RSRP) that is higher than an RSRP that is used for the second preferred resources.

Aspect 9: The method of Aspect 7 or 8, wherein transmitting the preferred resource information includes transmitting the preferred resource information in a coordination message that is included in sidelink control information or a medium access control control element (MAC CE).

Aspect 10: The method of any of Aspects 7-9, further comprising transmitting a first indication of a first modulation and coding scheme, a first channel quality indicator index, a first spectral efficiency for the first preferred resources, or some combination thereof and a second indication of one or more of a second modulation and coding scheme, a second channel quality indicator index, a second spectral efficiency for the second preferred resources, or some combination thereof.

Aspect 11: The method of any of Aspects 1-10, further comprising transmitting non-preferred resource information that indicates first non-preferred resources and that indicates that the first non-preferred resources are based at least in part on the IC capability.

Aspect 12: The method of Aspect 11, wherein the non-preferred resource information indicates second non-preferred resources and indicates that the second non-preferred resources are not based at least in part on the IC capability.

Aspect 13: The method of Aspect 12, wherein the first non-preferred resources are based at least in part on a first reference signal received power (RSRP) threshold that is higher than a second RSRP threshold that is used for the second non-preferred resources.

Aspect 14: The method of any of Aspects 1-13, further comprising transmitting information for multiple sets of resources based at least in part on multiple reference signal received power (RSRP) thresholds.

Aspect 15: The method of any of Aspects 1-14, further comprising performing IC on the sidelink communication.

Aspect 16: The method of any of Aspects 1-15, further comprising decoding the sidelink communication.

Aspect 17: A method of wireless communication performed by a first device, comprising: transmitting an indication of a preferred resource, for a sidelink communication, that is based at least in part on an interference cancellation (IC) capability of the first device; and receiving the sidelink communication from a second device.

Aspect 18: The method of Aspect 17, further comprising performing IC based at least in part on the IC capability of the first device.

Aspect 19: The method of Aspect 17 or 18, further comprising receiving resource information for the sidelink communication that indicates whether the resource information is associated with one or more of the IC capability of the first device or an IC capability of the second device.

Aspect 20: The method of any of Aspects 17-19, further comprising transmitting an IC indication that indicates that the preferred resource is associated with the IC capability of the first device.

Aspect 21: The method of any of Aspects 17-19, further comprising receiving an IC indication that indicates that the sidelink communication is intended for an IC capable receiver.

Aspect 22: The method of Aspect 21, wherein the IC indication is included in a request for a coordination message, a destination identifier, or a sidelink resource pool configuration.

Aspect 23: The method of any of Aspects 17-22, wherein the preferred resource is based at least in part on a first reference signal received power (RSRP) threshold that is higher than a second RSRP threshold that is used for preferred resources that are not based at least in part on the IC capability.

Aspect 24: A method of wireless communication performed by a second device, comprising: receiving, from a first device, an indication of an interference cancellation (IC) capability of the first device; selecting one or more resources for a sidelink communication based at least in part on the IC capability of the first device; transmitting, to the first device, resource information that indicates the one or more resources; and transmitting the sidelink communication based at least in part on the resource information.

Aspect 25: The method of Aspect 24, wherein the resource information indicates whether the resource information is associated with one or more of the IC capability of the first device or an IC capability of the second device.

Aspect 26: The method of Aspect 24 or 25, further comprising receiving an indication of one or more of a maximum modulation and coding scheme (MCS), a channel quality indicator (CQI) index, a spectral efficiency that is supported for preferred resources, or some combination thereof, wherein selecting the one or more resources includes selecting the one or more resources further based at least in part on the one or more of the maximum MCS, the CQI index, the spectral efficiency, or some combination thereof.

Aspect 27: The method of any of Aspects 24-26, further comprising transmitting an indication of the IC capability of the first device in sidelink control information, a destination identifier, or a sidelink resource pool configuration.

Aspect 28: The method of any of Aspects 24-27, further comprising receiving preferred resource information that indicates first preferred resources, second preferred resources, first non-preferred resources, second non-preferred resources, or some combination thereof, wherein the first preferred resources and the first non-preferred resources are based at least in part on the IC capability and the second preferred resources and the second non-preferred resources are not based at least in part on the IC capability, and wherein selecting the one or more resources includes selecting the one or more resources based at least in part on the one or more of the first preferred resources, the second preferred resources, the first non-preferred resources, the second non-preferred resources, or some combination thereof.

Aspect 29: The method of Aspect 28, wherein selecting the one or more resources includes selecting the one or more resources from among the first preferred resources and not from among the first non-preferred resources or the second non-preferred resources.

Aspect 30: The method of any of Aspects 24-29, wherein selecting the one or more resources includes selecting the one or more resources based at least in part on a first reference signal received power (RSRP) threshold that is based at least in part on the IC capability of the first device and that is higher than a second RSRP threshold that is used for preferred resources that are not based at least in part on the IC capability.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising: one or more memories storing processor-executable code; and one or more processors, coupled with the one or more memories, at least one processor of the one or more processors configured to cause the first device to:
transmit, to a second device, an indication of an interference cancellation (IC) capability of the first device;
receive, from the second device, in accordance with at least the indication of the IC capability of the first device, resource information for a sidelink communication; and
receive the sidelink communication from the second device in accordance with the resource information.

2. The first device of claim 1, wherein the one or more processors are configured to transmit an indication of a maximum modulation and coding scheme that is supported for preferred resources.

3. The first device of claim 1, wherein the one or more processors are configured to transmit an indication of a spectral efficiency that is supported for preferred resources.

4. The first device of claim 1, wherein the one or more processors are configured to transmit an indication of a channel quality indicator index that is supported for preferred resources.

5. The first device of claim 1, wherein the one or more processors are configured to determine a maximum modulation and coding scheme, a channel quality indicator index, a spectral efficiency for a preferred resource, or some combination thereof.

6. The first device of claim 1, wherein the one or more processors are configured to transmit preferred resource information that indicates first preferred resources and that indicates that the first preferred resources are in accordance with the IC capability of the first device.

7. The first device of claim 6, wherein the preferred resource information indicates second preferred resources and indicates that the second preferred resources are not in accordance with the IC capability.

8. The first device of claim 7, wherein the first preferred resources are in accordance with a reference signal received power (RSRP) that is higher than an RSRP that is used for the second preferred resources.

9. The first device of claim 7, wherein the one or more processors, to transmit the preferred resource information, are configured to transmit the preferred resource information in a coordination message that is included in sidelink control information or a medium access control control element (MAC CE).

10. The first device of claim 7, wherein the one or more processors are configured to transmit a first indication of a first modulation and coding scheme, a first channel quality indicator index, a first spectral efficiency for the first preferred resources, or some combination thereof and a second indication of one or more of a second modulation and coding scheme, a second channel quality indicator index, a second spectral efficiency for the second preferred resources, or some combination thereof.

11. The first device of claim 1, wherein the one or more processors are configured to transmit non-preferred resource information that indicates first non-preferred resources and that indicates that the first non-preferred resources are in accordance with the IC capability.

12. The first device of claim 11, wherein the non-preferred resource information indicates second non-preferred resources and indicates that the second non-preferred resources are not in accordance with the IC capability.

13. The first device of claim 12, wherein the first non-preferred resources are in accordance with a first reference signal received power (RSRP) threshold that is higher than a second RSRP threshold that is used for the second non-preferred resources.

14. The first device of claim 1, wherein the one or more processors are configured to transmit information for multiple sets of resources in accordance with multiple reference signal received power (RSRP) thresholds.

15. The first device of claim 1, wherein the one or more processors are configured to perform IC on the sidelink communication.

16. The first device of claim 1, wherein the one or more processors are configured to decode the sidelink communication.

17. A first device for wireless communication, comprising:
one or more memories storing processor-executable code; and
one or more processors, coupled with the one or more memories, at least one processor of the one or more processors configured to cause the first device to:
transmit, to a second device, an indication of a preferred resource, for a sidelink communication, that is in accordance with an interference cancellation (IC) capability of the first device;
receive, from the second device, resource information that indicates one or more resources, in accordance with at least the indication of the preferred resource; and
receive the sidelink communication from the second device.

18. The first device of claim 17, wherein the one or more processors are configured to perform IC in accordance with the IC capability of the first device.

19. The first device of claim 17, wherein the resource information indicates whether the resource information is associated with one or more of the IC capability of the first device or an IC capability of the second device.

20. The first device of claim 17, wherein the one or more processors are configured to transmit an IC indication that indicates that the preferred resource is associated with the IC capability of the first device.

21. The first device of claim 17, wherein the one or more processors are configured to receive an IC indication that indicates that the sidelink communication is intended for an IC capable receiver.

22. The first device of claim 21, wherein the IC indication is included in a request for a coordination message, a destination identifier, or a sidelink resource pool configuration.

23. The first device of claim 17, wherein the preferred resource is in accordance with a first reference signal received power (RSRP) threshold that is higher than a second RSRP threshold that is used for preferred resources that are not in accordance with the IC capability.

24. A second device for wireless communication, comprising:
one or more memories storing processor-executable code; and
one or more processors, coupled with the one or more memories, at least one processor of the one or more processors configured to cause the second device to:
receive, from a first device, an indication of an interference cancellation (IC) capability of the first device;
select one or more resources for a sidelink communication in accordance with the IC capability of the first device;
transmit, to the first device, resource information that indicates the one or more resources; and
transmit the sidelink communication to the first device in accordance with the resource information.

25. The second device of claim 24, wherein the resource information indicates whether the resource information is associated with one or more of the IC capability of the first device or an IC capability of the second device.

26. The second device of claim 24, wherein the one or more processors are configured to receive an indication of one or more of a maximum modulation and coding scheme (MCS), a channel quality indicator (CQI) index, a spectral efficiency that is supported for preferred resources, or some combination thereof, wherein the one or more processors, to select the one or more resources, are configured to select the one or more resources further in accordance with the one or more of the maximum MCS, the CQI index, the spectral efficiency, or some combination thereof.

27. The second device of claim 24, wherein the one or more processors are configured to transmit an indication of the IC capability of the first device in sidelink control information, a destination identifier, or a sidelink resource pool configuration.

28. The second device of claim 24, wherein the one or more processors are configured to receive preferred resource information that indicates first preferred resources, second preferred resources, first non-preferred resources, second non-preferred resources, or some combination thereof, wherein the first preferred resources and the first non-preferred resources are in accordance with the IC capability and the second preferred resources and the second non-preferred resources are not in accordance with the IC capability, and wherein the one or more processors, to select the one or more resources, are configured to select the one or more resources in accordance with the one or more of the first preferred resources, the second preferred resources, the first non-preferred resources, the second non-preferred resources, or some combination thereof.

29. The second device of claim 28, wherein the one or more processors, to select the one or more resources, are configured to select the one or more resources from among the first preferred resources and not from among the first non-preferred resources or the second non-preferred resources.

30. The second device of claim 24, wherein the one or more processors, to select the one or more resources, are configured to select the one or more resources in accordance with a first reference signal received power (RSRP) threshold that is in accordance with the IC capability of the first device and that is higher than a second RSRP threshold that is used for preferred resources that are not in accordance with the IC capability.

* * * * *